(12) United States Patent
Shimada et al.

(10) Patent No.: US 10,254,108 B2
(45) Date of Patent: Apr. 9, 2019

(54) OPTICAL MEASUREMENT DEVICE

(71) Applicant: OMRON Corporation, Kyoto-shi, Kyoto (JP)

(72) Inventors: Koji Shimada, Ritto (JP); Tomonori Kondo, Fukuchiyama (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/413,835

(22) Filed: Jan. 24, 2017

(65) Prior Publication Data

US 2017/0276474 A1    Sep. 28, 2017

(30) Foreign Application Priority Data

Mar. 24, 2016   (JP) .................................. 2016-060286

(51) Int. Cl.
*G01B 11/14* (2006.01)
*G05B 19/042* (2006.01)
*G05B 19/05* (2006.01)

(52) U.S. Cl.
CPC .......... *G01B 11/14* (2013.01); *G05B 19/0428* (2013.01); *G05B 19/054* (2013.01); *G05B 2219/1215* (2013.01); *G05B 2219/13063* (2013.01); *G05B 2219/25472* (2013.01); *G05B 2219/37526* (2013.01); *G05B 2219/37532* (2013.01)

(58) Field of Classification Search
CPC ....... G01B 11/14; G01B 11/25; G01B 11/024; G01B 11/0608; G01B 11/026; G05B 19/0428; G05B 19/054
USPC ................................................. 356/614-623
See application file for complete search history.

(56) References Cited

U.S. PATENT DOCUMENTS 3,519,750 A * 7/1970 Beresin .................. H04B 1/745
                                                                370/228
4,734,909 A * 3/1988 Bennett ............... G06F 11/0751
                                                                370/462

(Continued)

FOREIGN PATENT DOCUMENTS

CN          103261983 A       8/2013
CN          103414547 A       11/2013

(Continued)

OTHER PUBLICATIONS

Extended European Search Report for European Application No. 17152142.0 dated Aug. 21, 2017 in 8 pages.

(Continued)

*Primary Examiner* — Isiaka Akanbi
(74) *Attorney, Agent, or Firm* — Knobbe, Martens, Olson & Bear, LLP

(57) ABSTRACT

An optical measurement device configured for connection to an industrial network, the industrial network functioning to synchronize time between a master device and a slave device, the optical measurement device includes: an interface module configured to receive a synchronization signal transmitted on the industrial network from the master device within a fixed communication cycle; and a measurement unit configured to perform optical measurements in a measurement cycle. The measurement unit synchronizes when a measurement is taken with the communication cycle in accordance with the synchronization signal received by the interface module.

7 Claims, 15 Drawing Sheets

(56) References Cited

U.S. PATENT DOCUMENTS

| | | | |
|---|---|---|---|
| 4,982,185 A | | 1/1991 | Holmberg et al. |
| 2002/0154318 A1* | | 10/2002 | Matsunaga .......... G01B 11/024 356/623 |
| 2002/0185998 A1 | | 12/2002 | Beck |
| 2003/0067613 A1* | | 4/2003 | Ishikawa ................ G01B 11/25 356/614 |
| 2005/0222693 A1* | | 10/2005 | Inoue ....................... H04Q 9/00 700/28 |
| 2006/0152392 A1* | | 7/2006 | Biehler .................. H04L 29/06 341/60 |
| 2007/0288674 A1 | | 12/2007 | Ikeno |
| 2008/0088856 A1* | | 4/2008 | Nishio ................ G01B 11/026 356/623 |
| 2012/0057479 A1 | | 3/2012 | Maruyama et al. |
| 2013/0229512 A1 | | 9/2013 | Steffey et al. |
| 2013/0254584 A1 | | 9/2013 | Tamaoki |
| 2015/0049186 A1 | | 2/2015 | Pettersson et al. |

FOREIGN PATENT DOCUMENTS

| | | |
|---|---|---|
| CN | 103988049 A | 8/2014 |
| EP | 1253494 A2 | 10/2002 |
| EP | 2287693 A1 | 2/2011 |
| JP | 2007-312043 | 11/2007 |
| JP | 2012-60207 A | 3/2012 |
| JP | 2015-534055 A | 9/2013 |
| JP | 2014-85803 A | 5/2014 |
| JP | 2014-96036 A | 5/2014 |

OTHER PUBLICATIONS

Office Action received in Japanese Patent Application. No. 2016-060286, dated Oct. 2, 2018.

Office Action received in Chinese Patent Application No. 201710036547.0, dated Feb. 25, 2019.

* cited by examiner

OPTICAL MEASUREMENT DEVICE

FIELD

The present invention relates in general to an optical measurement device, and relates more specifically to an optical measurement device that can be connected to an industrial network.

BACKGROUND

Typically, the machines and equipment used at many production sites are controlled by a control device such as a programmable controller (also referred to below as a Programmable Logic Controller, PLC).

Communications between the PLC and one or multiple remote IO terminals may be implemented using polling, and in this case, the PLC acts as a master device managing all communications. For example, Japanese Unexamined Patent Publication No. 2007-312043 discloses a communication protocol where communications between the master device and slave device in a remote IO system typically use either broadcast or polling.

Technical Problem

Recently, it is common practice to build an on-site network (also called a fieldbus) for transmitting the control commands and data signals used in industrial automation. One such network is EtherCAT (Registered Trademark). One strength of the EtherCAT fieldbus is its synchrony. All slave devices can be synchronized with a communication jitter of 1 μs or less. During synchronization, each slave device acquires an output signal (control signal) from the master device, and expresses the value obtained externally by the slave device in an input signal (i.e., as a measurement value, a state value, or the like) bound for the master device.

In contrast, there are also optical measurement devices capable of continuous measurements through internal synchronization. This kind of optical measurement device can be connected to EtherCAT, however its synchronization with the other devices connected on EtherCAT is problematic. In order to implement highly accurate measurement, it is important to know when the measurement device obtained the data that is in the signals entering the PLC.

Despite that, the optical measurement device must acquire optical information over a certain period to obtain a measurement value. In other words, a measurement period includes the time it takes to receive the optical information. As a result, sometimes there is no synchronization between when a measurement is taken and when the measurement result is output. Consequently, it tends to be difficult for a master device to determine when the optical measurement device obtained the measurement result included in the data output by the optical measurement device.

Embodiments of the present invention provide an optical measurement device that performs measurements whereby a master device can determine when a measurement was taken from the measurement value entering thereinto.

SUMMARY

One aspect of the present invention is an optical measurement device configured for connection to an industrial network, the industrial network functioning to synchronize time between a master device and a slave device. The optical measurement device provided with an interface module configured to receive a synchronization signal transmitted on the industrial network from the master device within a fixed communication cycle, and a measurement unit configured to perform optical measurements in a measurement cycle. The measurement unit synchronizes when a measurement is taken with the communication cycle in accordance with a synchronization signal received by the interface module.

The above-mentioned configuration provides an optical measurement device that performs measurements whereby a master device can determine when a measurement was taken from the measurement value entering thereinto. The measurement cycle of the optical measurement device is synchronized with the communication cycle of the industrial network; thus, when the optical measurement device sends a measurement value to the master device, the master device can determine internally during which communication cycle the measurement value was acquired. Therefore, the master device is able to determine when the optical measurement device acquired a measurement.

The measurement unit may perform computations on a plurality of values obtained via measurements over a plurality of measurement cycles within the communication cycle to compute a measurement value.

The above-mentioned configuration allows the optical measurement device to output highly accurate measurement values.

A measurement cycle may be 1/N or N times a communication cycle, where N is an integer greater than or equal to 1.

The above-mentioned configuration allows measurements to be taken continuously without pauses. Note that the optical measurement device may output all the plurality of values obtained through continuous measurement. Alternatively, the optical measurement device may compute a measurement value using the above-described computation process and output the measurement value resulting from that computation.

The measurement unit may start measurement after an offset time passes since receiving a synchronization signal.

The above-mentioned configuration allows input of the measurement results from the optical measurement device to the master device to be coordinated with input from other slave devices to the master device.

The optical measurement device may be an optical displacement sensor. The above-mentioned configuration allows the master device to determine when an optical displacement sensor takes a measurement by acquiring a measurement value from the optical displacement sensor.

Effects

Embodiments of the present invention provide an optical measurement device that performs measurements whereby a master device can determine when a measurement was taken from the measurement value entering thereinto.

DETAILED DESCRIPTION

Figure 1:
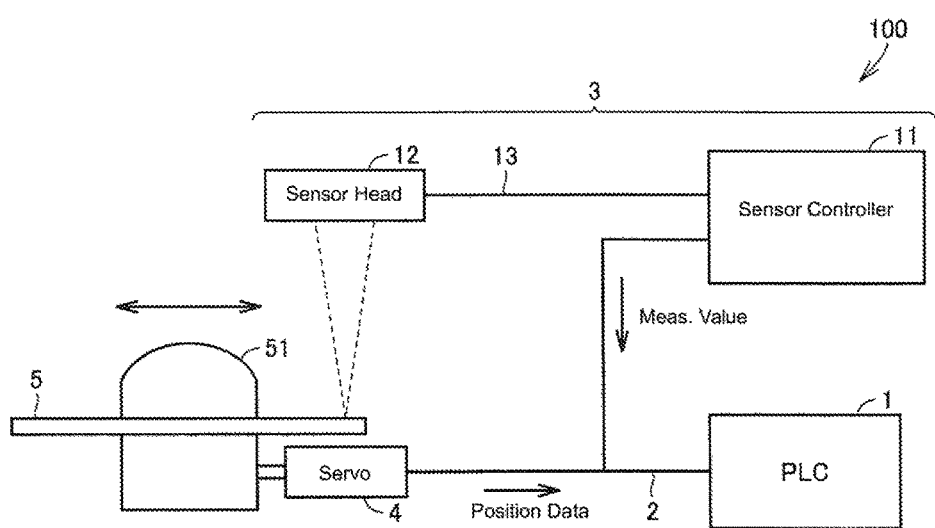
FIG. 1 is a schematic diagram illustrating an example configuration of a measurement system according to an embodiment of the invention.

Embodiments of the present invention are described in detail with reference to the drawings. The same or corresponding elements within the drawings are given the same reference numerals and the explanations therefor are not repeated.

A. Example Configuration of the Control System

FIG. 1 is a schematic diagram illustrating an example configuration of a measurement system 100 according to an embodiment of the invention. Referring to FIG. 1, the measurement system 100 includes a PLC 1, a fieldbus 2, and optical measurement device 3, and a servo motor 4.

The PLC 1, the optical measurement device 3, and the servo motor 4 are connected to the fieldbus 2. The fieldbus 2 transmits the various data exchanged with the PLC 1. Any of the various kinds of industrial Ethernet (Registered Trademark) may be used for the fieldbus 2. The industrial Ethernet may be, for instance, EtherCAT, PROFINET (Registered Trademark), or the like. The following description includes EtherCAT as representative of the fieldbus 2.

The servo motor 4 moves a stage 5. Although not shown, the servo motor contains an encoder. An encoder value is equivalent to positional data representing the position of the stage 5. The positional data enters the PLC 1 via the fieldbus 2.

The optical measurement device 3 measures the displacements on a measurement object 51 placed on the stage 5. The optical measurement device 3 contains a sensor controller 11, a sensor head 12, and a cable 13. The sensor head 12 is connected to the sensor controller 11 via the cable 13.

Control signals from the sensor controller 11 are sent to the sensor head 12 through the cable 13. As is later described, the sensor head 12 includes a light emitting unit and a light receiving unit. The light emitting unit radiates light towards the stage 5, and the light receiving unit receives light reflecting from the stage 5. The light receiving unit outputs a signal and that signal is sent to the sensor controller 11 via the cable 13. The sensor controller 11 computes a measurement value on the basis of a signal from the sensor head 12. A measurement value is sent from the sensor controller 11 to the PLC 1 via the fieldbus 2.

The servo motor 4 moves the stage 5 whereby the optical measurement device 3 can scan the surface of the measurement object 51. Therefore, the optical measurement device 3 can thus measure the displacements from the sensor head 12 to the surface of the measurement object 51 along the moving direction of the stage 5. Consequently, the optical measurement device 3 can measure the surface topography of the measurement object 51 along the moving direction of the stage 5.

This embodiment ensures synchrony between the positional data (i.e., the encoder value) entered from the servo motor 4 to the PLC 1 and the measurement value entered from the optical measurement device 3 to the PLC 1. Therefore, because it is possible to accurately map positional information to a measurement value (displacement information), more accurate information may be obtained regarding the surface topography of the measurement object 51.

B. The Fieldbus

Figure 2:
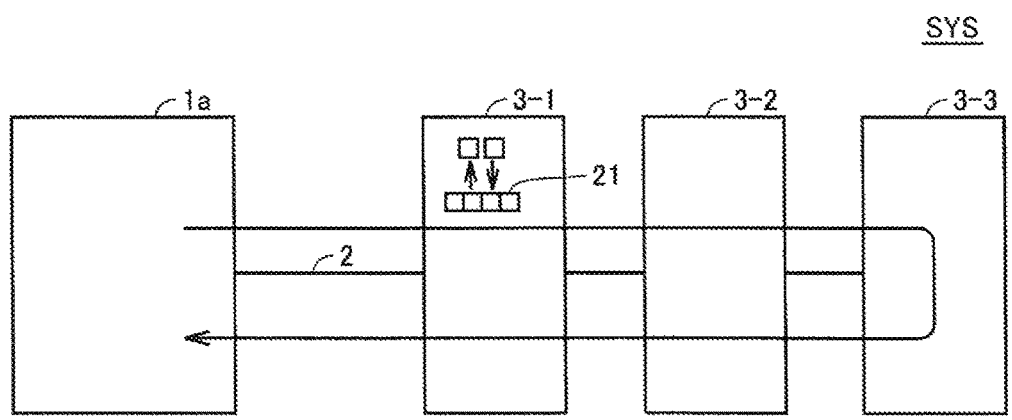
FIG. 2 is a schematic block diagram for describing synchronization of slave devices on EtherCAT.

FIG. 2 is a schematic block diagram for describing synchronization of slave devices on EtherCAT. Referring to FIG. 2, a control system SYS is composed of a master device 1a, slave devices 3-1, 3-2, 3-3, and the fieldbus 2, which connects the master device 1a and the slave devices 3-1, 3-2, 3-3.

The master device 1a manages the slave devices 3-1, 3-2, 3-3. Each of the slave devices 3-1, 3-2, 3-3 transmits IEEE 802.3 Standard Ethernet (Registered Trademark) frames at high speeds. As illustrated in FIG. 2, the master device 1a transmits a frame 21, and the frame 21 passes through the slave devices 3-1, 3-2, 3-3 sequentially. The frame 21 is sent back from the slave device 3-3 and returns to the master device 1a. A frame 21 may contain a control command and data.

On EtherCAT, one cycle is taken as the moment the master device 1a transmits the frame 21 until the frame 21 returns to the master device 1a. When the frame 21 passes through a slave device, the slave device executes input and output processes on the fly. Therefore, the slave devices complete all input and output processes within the space of a cycle.

Figure 3:
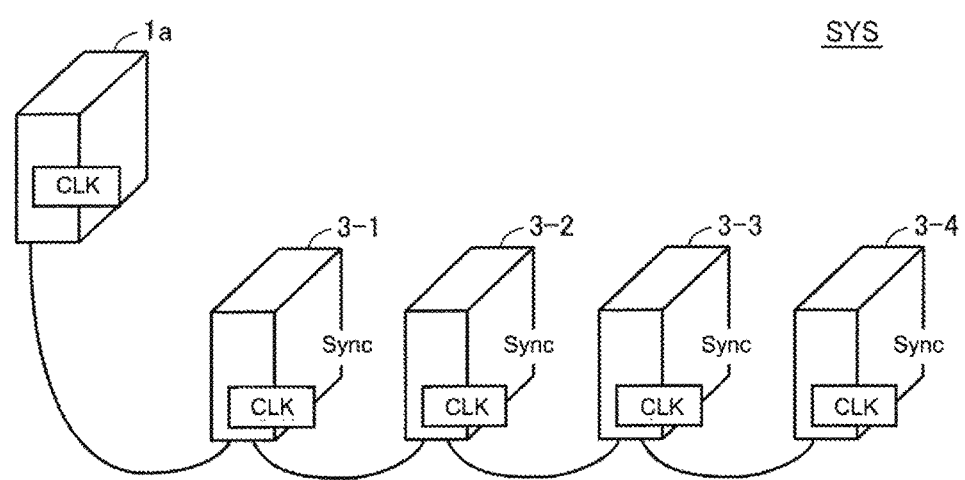
FIG. 3 is a schematic view for describing the time synchronization function on EtherCAT.

FIG. 3 is a schematic view for describing the time synchronization function on EtherCAT. Referring to FIG. 3, the master device 1a and the slave devices 3-1, 3-2, 3-3, 3-4 each includes a clock. These clocks are the basis for the defining the execution times for processes in each of the devices. In more concrete terms, each of the master device 1a and the slave devices 3-1, 3-2, 3-3, 3-4 includes a timer that periodically generates time information, which becomes the basis for synchronization. The clock in the master device 1a is the reference, and the slave devices 3-1, 3-2, 3-3, 3-4 synchronize with the clock in the master device 1a. More specifically, a slave device 3-1, 3-2, 3-3, 3-4 corrects any temporal deviations generated in its timer on the basis of the frame (FIG. 2) periodically transmitted thereto on the fieldbus 2. Hereby, the deviation of the jitter among all the slave devices can be kept at or under 1 µs.

C. Problems with Unsynchronized Measurement and Communication Cycles

Figure 4:
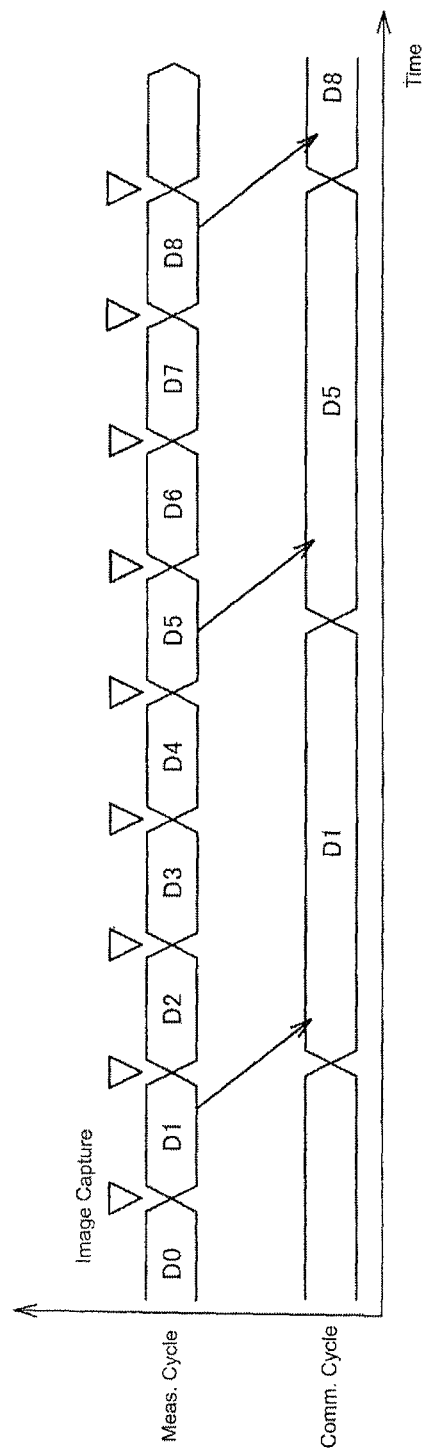
FIG. 4 is a timing chart for describing the problems that occur when the measurement cycle of an optical measurement device connected to a fieldbus and the communication cycle on EtherCAT are not synchronized.

FIG. 4 is a timing chart for describing the problems that occur when the measurement cycle of an optical measurement device connected to a fieldbus and the communication cycle on EtherCAT are not synchronized. Referring to FIG. 4 the optical measurement device (e.g., an optical displacement sensor) usually captures images in accordance with a measurement cycle defined internally by the optical measurement device itself. The optical measurement device outputs a measurement value per communication cycle.

Figure 5:
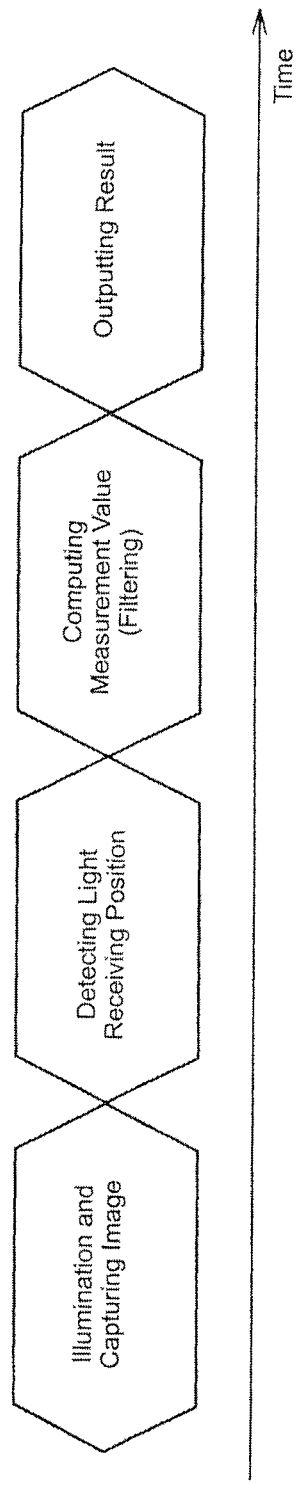
FIG. 5 is a timing chart for describing the flow of processes for a typical optical displacement sensor.

FIG. 5 is a timing chart for describing the flow of processes for the typical optical displacement sensor. Referring to FIG. 5, an illumination source is switched on and an image is captured. Next, the process for detecting the light receiving position is executed. For instance, the position at which the maximum light intensity is received in the imaging element (i.e. the pixel at that position) may be identified to detect the light receiving position. Processes such as filtering, computing a mean value, and the like may be executed to compute the measurement value. After the measurement values are computed, the measurement result is output.

Returning to FIG. 4, the timing for image capture is within the measurement cycle. However, the measurement of the displacement may take place a plurality of times in order to compute the measurement value, for example. Therefore, the time at which an image is captured to take a plurality of measurements, may differ from the time at which the measurement value is output (or the measurement result is updated). This scenario is not limited to optical displacement sensors. An optical measurement device may capture an image, and output or update a measurement value at different times.

Because the communication cycle on the fieldbus and the measurement cycle are not synchronized, the PLC is unable to determine when the measurement results sent from the optical measurement device were acquired. To address such a problem, in the embodiment the optical measurement device synchronizes the measurement cycle with the communication cycle of the fieldbus. Hereby, when the optical measurement device sends a measurement value to the master device (i.e., the PLC), the master device is able to determine internally during which communication cycle the measurement value was acquired. Therefore, the PLC can determine when the optical measurement device acquired a measurement.

D. Configuration of the Optical Measurement Device

Figure 6:
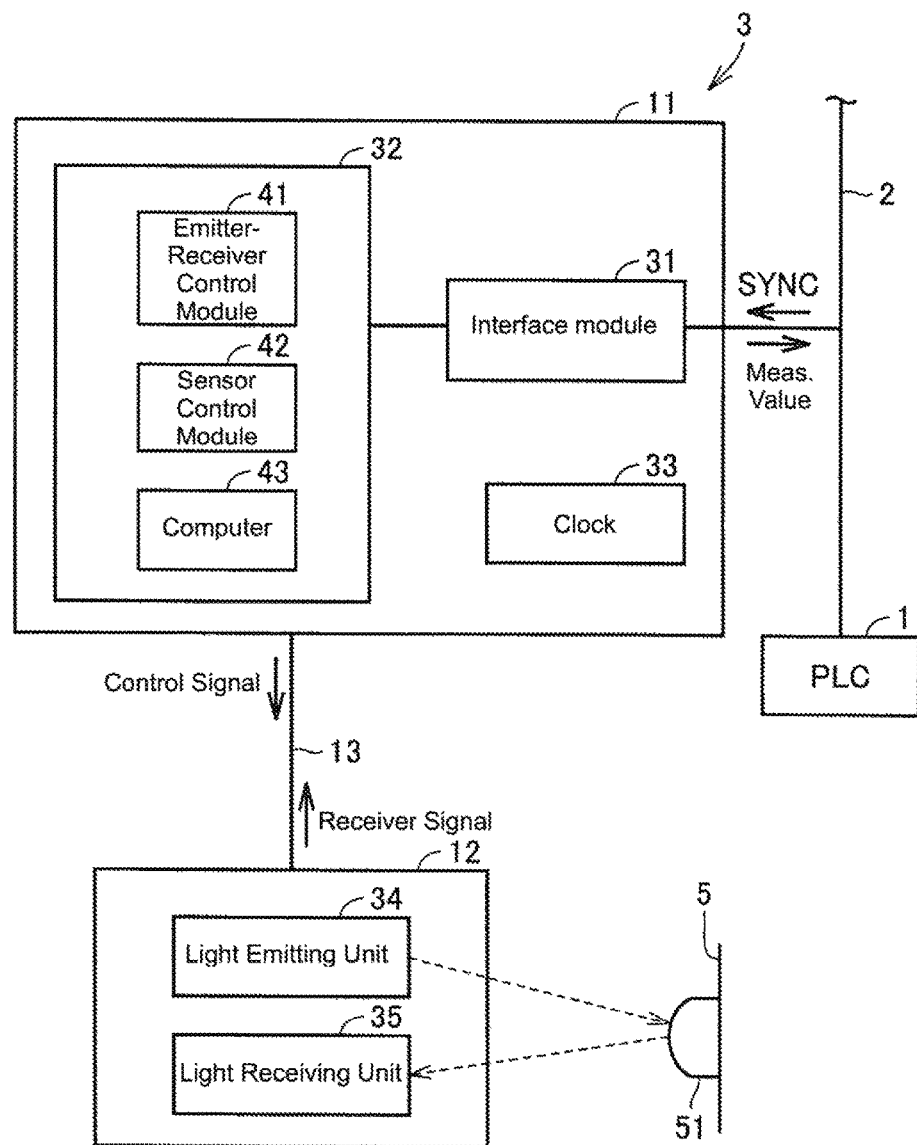
FIG. 6 is a block diagram illustrating a detailed configuration of an optical measurement device according to an embodiment of the invention.

FIG. 6 is a block diagram illustrating a detailed configuration of an optical measurement device according to an embodiment of the invention. Referring to FIG. 6, the sensor controller 11 includes an interface module 31, a measurement unit 32, and a clock 33. The measurement unit 32 contains an emitter-receiver control module 41, a sensor control module 42, and a computer 43.

The interface module 31 performs input to and output from the fieldbus 2. The interface module 31 receives sync signals from the PLC 1 and sends measurement values to the PLC1 via frames 21 (FIG. 2) transmitted on the fieldbus 2. A sync signal is generated for each communication cycle; and the sync signal is for synchronizing the measurement cycle with the communication cycle. The interface module 31 sends the measurement values output from the computer 43 to the PLC 1 via the fieldbus 2.

The measurement unit 32 performs overall control of the optical measurement device 3, whereby the displacement of a measurement object 51 is optically measured in accordance with a measurement cycle. The emitter-receiver control module 41 issues a control command which initiates measurement of the measurement object in response to the sync signal. Consequently, the sensor control module 42 and the computer 43 carry out the measurement process.

The clock 33 generates a clock signal that defines, for example, when processes are executed in the optical measurement device 3. A measurement cycle is determined on the basis of this clock signal. However, the clock signal is not limited to a signal generated inside the sensor controller 11. The clock signal may be externally supplied to the sensor controller 11.

The sensor head 12 receives control signals from the sensor control module 42 via the cable 13. The sensor head 12 includes the light emitting unit 34 and a light receiving unit 35.

The light emitting unit 34 emits light towards the stage 5 in response to a control signal. The light receiving unit 35 receives light reflected by the stage 5 or the measurement object 51. Although not depicted, the light receiving unit 35 may include an imaging element. The light receiving unit 35 outputs a receiver signal representing the amount of light received at the light receiving unit 35. The receiver signal is transmitted to the measurement unit 32 via the cable 13. The computer 43 computes a measurement value on the basis of the received light intensity represented by the receiver signal.

Note that the method for measuring displacement is not particularly limited when the optical measurement device 3 is an optical displacement sensor. Displacement may be measured using the white-light confocal principle or triangulation, for example.

E. Example: Synchronizing the Measurement and Communication Cycles

Figure 7:
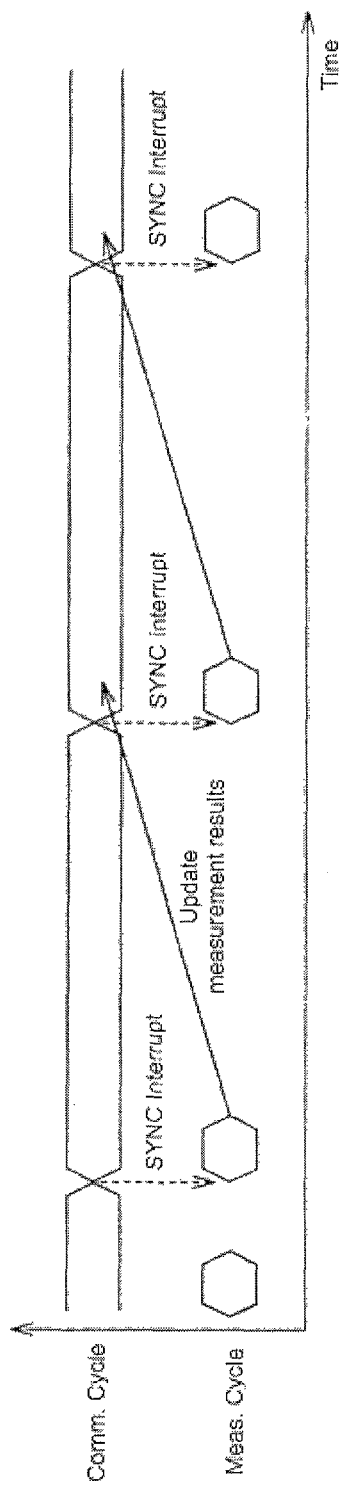
FIG. 7 is a timing chart schematically depicting a first example of an optical measurement device according to an embodiment of the invention synchronizing the measurement cycle and the communication cycle.

FIG. 7 is a timing chart schematically depicting a first example of an optical measurement device 3 according to an embodiment of the invention synchronizing the measurement cycle and the communication cycle. Referring to FIG. 6 and FIG. 7, the optical measurement device 3 starts the measurement process in response to receiving a sync signal. An interrupt is generated in the optical measurement device 3 for initiating the measurement process when the optical measurement device 3 receives the sync signal. Accordingly, the receipt of a sync signal is depicted as a "SYNC Interrupt" in FIG. 7 and later drawings.

The optical measurement device 3 synchronizes with the sync interrupt and starts the measurement. The measurement results are sent from the optical measurement device 3 to the PLC 1 during the next communication cycle. As a result, the measurement results are updated in the PLC 1.

In the example illustrated in FIG. 7, the timing for starting measurement is synchronized with the timing at which the sync interrupt is produced. A sync interrupt is generated per communication cycle. Accordingly, the measurement cycle of the optical measurement device 3 synchronizes with the communication cycle.

Figure 8:
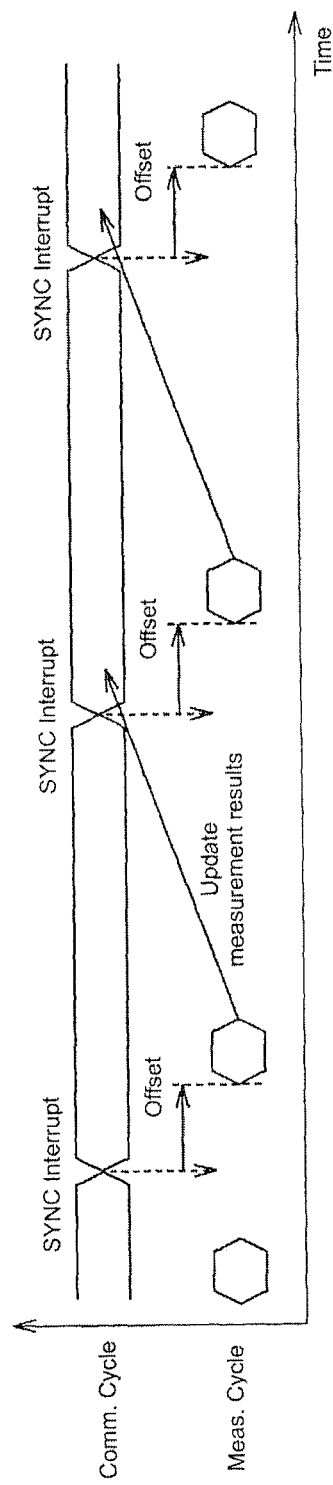
FIG. 8 is a timing chart schematically depicting a second example of the optical measurement device according to an embodiment of the invention synchronizing the measurement cycle and the communication cycle.

FIG. 8 is a timing chart schematically depicting a second example of the optical measurement device 3 according to an embodiment of the invention synchronizing the measurement cycle and the communication cycle. Referring to FIG. 7 and FIG. 8, measurement starts after an offset time since the generation of the sync interrupt. The offset time in the example illustrated in FIG. 8, is different from the offset time in FIG. 7. The measurement results are then sent from the optical measurement device 3 to the PLC 1 during the next communication cycle.

Establishing an offset time allows, for instance, the input of the measurement results from the optical measurement device 3 to the PLC 1 to be coordinated with input from other slave devices to the PLC 1. The offset time may be fixed or may be variable. The example in FIG. 7 depicts when the offset time is zero.

Figure 9:
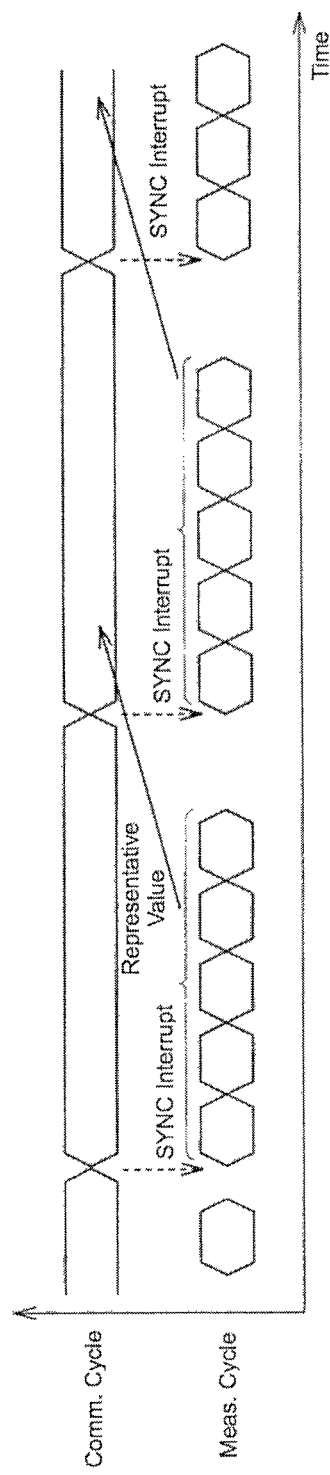
FIG. 9 is a timing chart schematically depicting a third example of the optical measurement device according to an embodiment of the invention synchronizing the measurement cycle and the communication cycle.

FIG. 9 is a timing chart schematically depicting a third example of the optical measurement device 3 according to an embodiment of the invention synchronizing the measurement cycle and the communication cycle. Referring to FIG. 6 and FIG. 9, here, a plurality of measurement processes are executed during one communication cycle, with the sync interrupt as the start time. That is, one communication cycle contains a plurality of measurement cycles. The number of measurement processes may be set, for instance, by a user, or by the measurement unit 32.

That is, a plurality of measurement values are yielded during one communication cycle. For instance, the computer 43 performs a predetermined process on the plurality of measurement values to compute a representative value. The representative value is sent from the optical measurement device 3 to the PLC 1 during the next communication cycle.

Such a representative value is not limited for instance, to an average of the plurality of measurement values and may be the maximum, minimum, or median. The representative value may also be a derivative of the plurality of measurement values. Alternatively, the computer 43 may filter the plurality of measurement values to compute a representative value. Note that, the computer 43 is not limited to outputting a representative value of the plurality of measurement values. The computer 43 may output all the plurality of measurement values.

Figure 10:
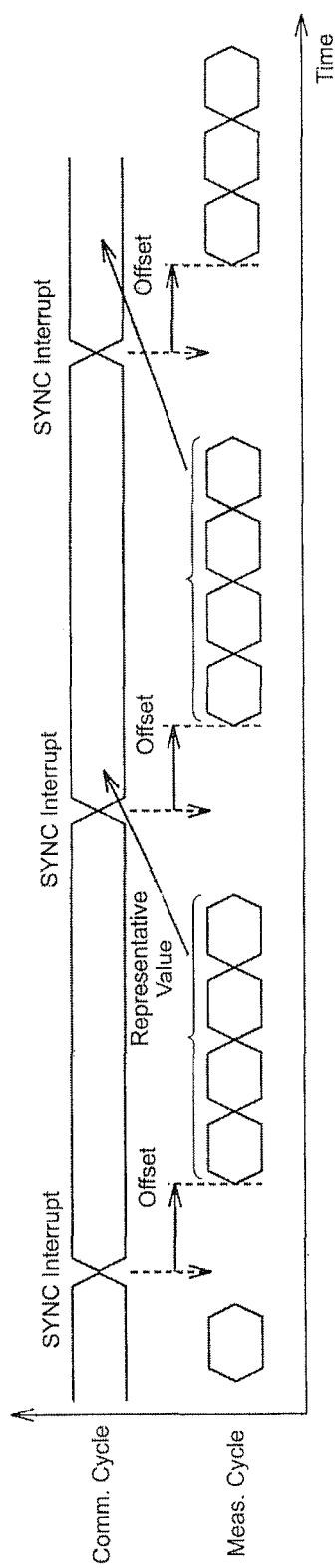
FIG. 10 is a timing chart schematically depicting a fourth example of the optical measurement device according to an embodiment of the invention synchronizing the measurement cycle and the communication cycle.

FIG. 10 is a timing chart schematically depicting a fourth example of the optical measurement device 3 according to an embodiment of the invention synchronizing the measurement cycle and the communication cycle. Referring to FIG. 9 and FIG. 10, measurement starts after an offset time since the generation of the sync interrupt. The offset time in the example illustrated in FIG. 10, is different from the offset time in FIG. 9. A desired delay time may be established to serve as the offset time. Hereby, the measurements taken by the optical measurement device 3 may be coordinated with the desired measurement time.

Figure 11:
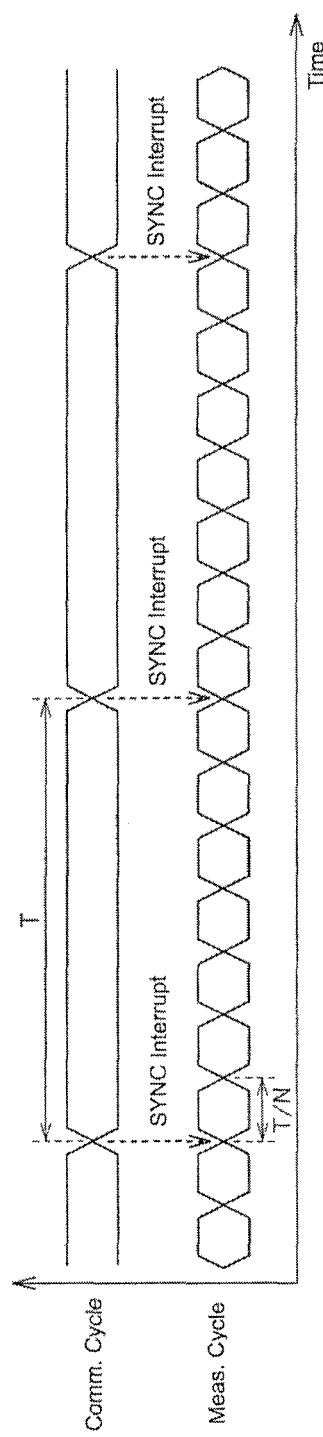
FIG. 11 is a timing chart schematically depicting a fifth example of the optical measurement device according to an embodiment of the invention synchronizing the measurement cycle and the communication cycle.

FIG. 11 is a timing chart schematically depicting a fifth example of the optical measurement device 3 according to an embodiment of the invention synchronizing the measurement cycle and the communication cycle. Referring to FIG. 11, here, the measurement cycle is 1/N times the communication cycle (where N is an integer greater than or equal to 1). That is, if the communication cycle is T, the measurement cycle is T/N.

The optical measurement device 3 is configured so that the measurement cycle satisfies the above-mentioned relationship. The optical measurement device may thusly perform continuous measurement without pauses. The optical measurement device may output all the data obtained during the continuous measurement, or may output a representative value from among a plurality of measurement values.

Note that, although the measurement cycle is said to be 1/N of the communication cycle, there is still a possibility that there will be a temporal error between the length of N measurement cycles and one communication cycle. Therefore, it is more preferable to correct for an error at each sync interrupt.

Figure 12:
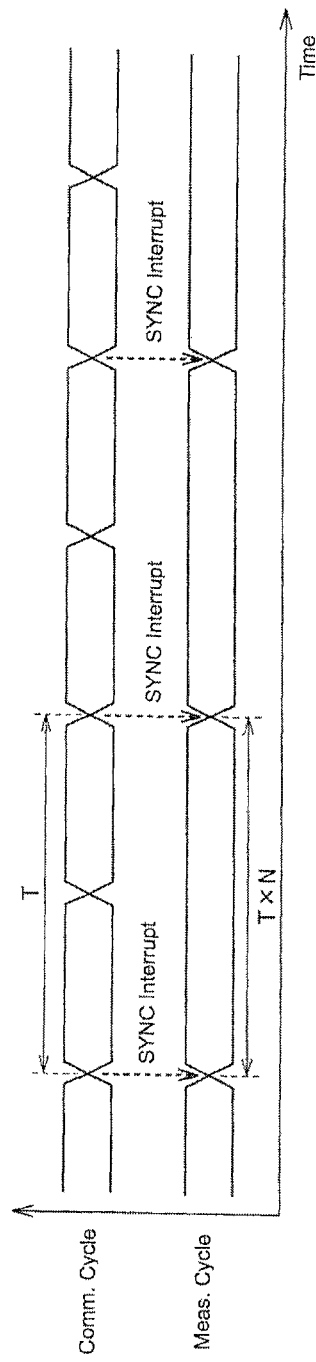
FIG. 12 is a timing chart schematically depicting a sixth example of the optical measurement device according to an embodiment of the invention synchronizing the measurement cycle and the communication cycle.

FIG. 12 is a timing chart schematically depicting a sixth example of the optical measurement device 3 according to an embodiment of the invention synchronizing the measurement cycle and the communication cycle. Referring to FIG. 12, here, the measurement cycle is N times the communication cycle (where N is an integer greater than or equal to 1). That is, if the communication cycle is T, the measurement cycle is T×N. The optical measurement device 3 is configured so that the measurement cycle satisfies the above-mentioned relationship. The optical measurement device may thusly perform continuous measurement without pauses. The optical measurement device may output all the data obtained during the continuous measurement, or may output a representative value from among a plurality of measurement values.

Figure 13:
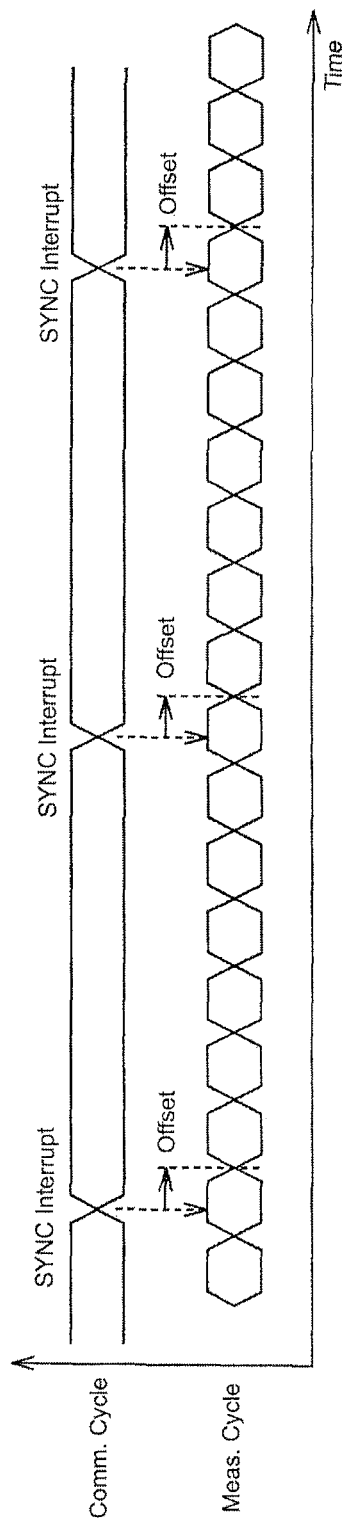
FIG. 13 is a timing chart schematically depicting a seventh example of the optical measurement device according to an embodiment of the invention synchronizing the measurement cycle and the communication cycle.

FIG. 13 is a timing chart schematically depicting a seventh example of the optical measurement device 3 according to an embodiment of the invention synchronizing the measurement cycle and the communication cycle. Referring to FIG. 11 and FIG. 13, measurement starts after an offset time since the generation of the sync interrupt. The offset time in the example illustrated in FIG. 13, is different from the offset time in FIG. 11. Similar to the example in FIG. 10, a desired delay time may be established to serve as an offset time. Hereby, the measurements taken by the optical measurement device 3 may be coordinated with the desired measurement time. Note that as with the example depicted in FIG. 12, a delay time may be set to serve as an offset time whereby measurement starts after the offset time has passed since the generation of the sync interrupt.

F. Synchronization Between a Plurality of Slave Devices

Figure 14:
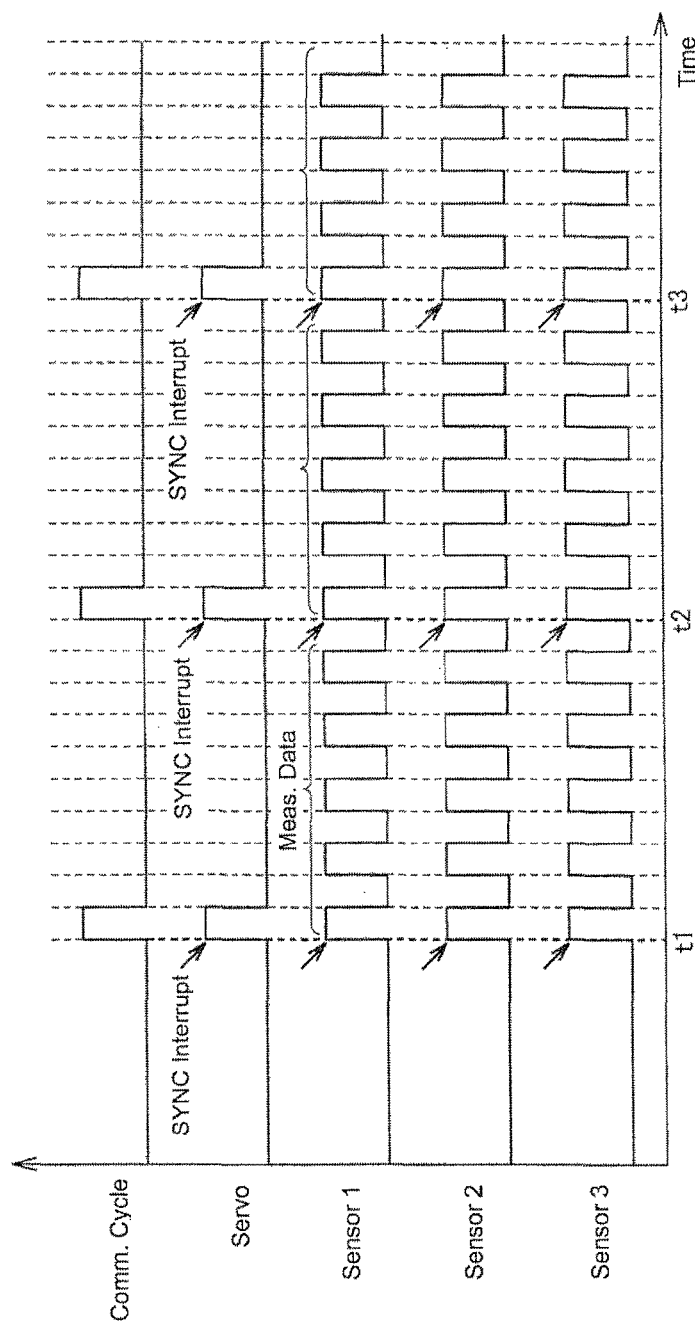
FIG. 14 is a timing chart schematically depicting synchronization between a plurality of slave devices, including the optical measurement device according to an embodiment of the invention.

FIG. 14 is a timing chart schematically depicting synchronization between a plurality of slave devices including the optical measurement device 3 according to an embodiment of the invention. Note that the configuration of a measurement system containing a plurality of slave devices is basically identical to the configuration depicted in FIG. 1. Where FIG. 1 depicts a single optical measurement device according to the embodiment, the system in the example described below contains three optical measurement devices 3 according to the embodiment. The configuration may be such that at least one of the three sensors depicted as "Sensor 1", "Sensor 2", and "Sensor 3" in FIG. 14 is the optical measurement device 3, while the remaining two are other types of sensors.

Referring to FIG. 14, inputs from the three sensors to the PLC and input from the servo motor to the PLC are synchronized with the communication cycle. Moreover, the measurement cycle of each of the three sensors is 1/N times the communication cycle. In this example, the communication cycle is 125 μs and the measurement cycle is 25 μs. That is, the measurement cycle is one-fifth (⅕) the communication cycle.

A sync interrupt is generated at times t1, t2, and t3. Each of the three sensors takes measurements five times between time t1 and time t2, and between time t2 and time t3. The PLC obtains these measurement results during the next communication cycle.

Synchronizing when the optical measurement device 3 performs a measurement with the communication cycle in this manner, allows the PLC 1 to accurately associate the position data from the servo motor 4 and the measurement value from the optical measurement device 3. It is therefore possible to obtain a more accurate surface topography.

G. Flow of the Synchronization Process

Figure 15:
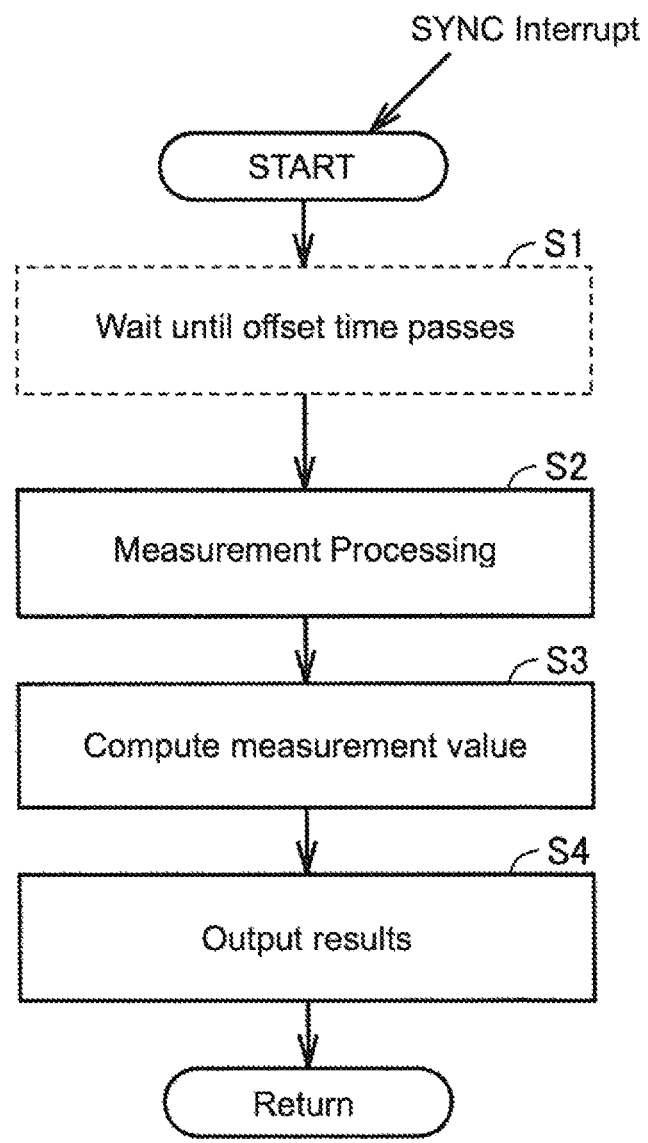
FIG. 15 is a flowchart illustrating a series of processes executed by the optical measurement device according to an embodiment of the invention.

FIG. 15 is a flowchart illustrating a series of processes executed by the optical measurement device 3 according to an embodiment of the invention. Referring to FIG. 6 and FIG. 15, measurement starts due to the generation of a sync interrupt. The optical measurement device 3 waits until the offset time has passed in step S1. The processing in step S1 is essentially skipped when the offset time is zero (e.g., as illustrated in FIG. 7).

In step S2, the optical measurement device 3 performs a measurement. More specifically, the optical measurement device executes processes according to the procedure depicted in FIG. 5.

In step S3, the optical measurement device 3 computes the measurement value. The computer 43 executes processes such as filtering, and the like, to compute a representative value when a plurality of measurements is taken.

In step S4, the optical measurement device outputs the measurement result (i.e., the measurement value). The interface module 31 sends the measurement value to the PLC 1 during the next communication cycle via a frame 21 transmitted on the fieldbus 2.

Obtaining a measurement value requires that the optical measurement device 3 emits light and captures images over a certain period of time. In the embodiment, the optical measurement device 3 starts the measurement process due to the sync interrupt. A sync interrupt is generated for each EtherCAT communication cycle. Therefore, the timing at which measurements are performed is determined in accordance with the communication cycle. Although the optical measurement device 3 possesses its own measurement cycle, the PLC 1 is able to determine when the measurement value entering the PLC 1 was acquired.

In the above-mentioned examples, the measurement value enters the PLC 1 during the communication cycle after the measurement was performed; however, the embodiments are not limited to this configuration. The measurement value may enter the PLC 1 at an even later communication cycle. Because the measurement is taken synchronously with a communication cycle, the PLC 1 is capable of assessing during which communication cycle the measurement value entering the PLC was obtained.

All aspects of the embodiments disclosed should be considered merely examples and not limitations as such. The scope of the present invention is not limited to the above description but to the description in the claims, and is intended to include all equivalents and modifications allowable by the claims.

The invention claimed is:

1. An optical measurement device connected to an industrial network the industrial network synchronizing time between a master device and a slave device, the optical measurement device comprising:
   an interface module connected to the industrial network, the interface module receiving a synchronization signal transmitted on the industrial network from the master device within a fixed communication cycle; and
   a measurement unit connected to the interface module, the measurement circuitry performing optical, measurements in a measurement cycle; wherein
   the measurement unit synchronizes when a measurement is taken with the communication cycle in accordance with the synchronization signal received by the interface module,
   a measurement cycle is 1/N or N times a communication cycle, where N is an integer greater than or equal to 1, and
   the measurement unit corrects a temporal error between the length of the measurement cycles and one communication cycle at each synchronization interrupt.

2. The optical measurement device according to claim 1, wherein the measurement unit performs computations on a plurality of values obtained via measurements over a plurality of measurement cycles within the communication cycle to compute a measurement value.

3. The optical measurement device according to claim 2, wherein the optical measurement device is an optical displacement sensor.

4. The optical measurement device according to claim 2, wherein the measurement unit starts measurement after an offset time passes since receiving a synchronization signal.

5. The optical measurement device according to claim 4, wherein the optical measurement device is an optical displacement sensor.

6. The optical measurement device according to claim 1, wherein the measurement unit starts measurement after an offset time passes since receiving a synchronization signal.

7. The optical measurement device according to claim 1, wherein the optical measurement device is an optical displacement sensor.

\* \* \* \* \*